Figure 1:
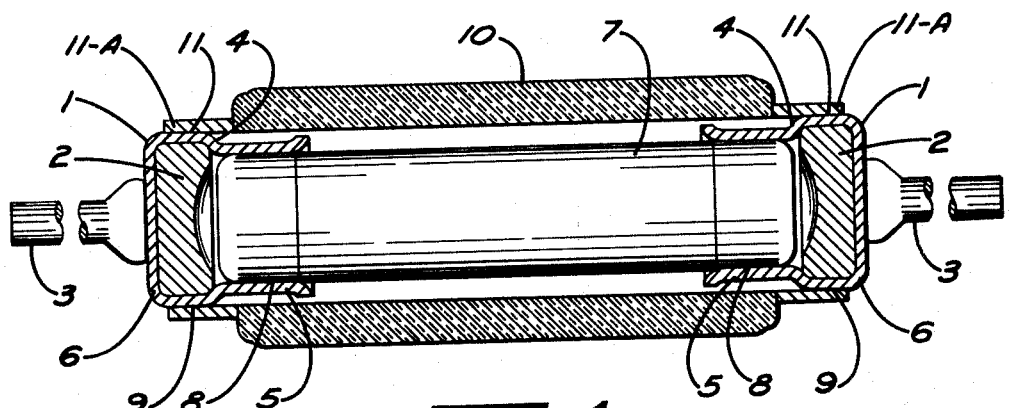

March 9, 1965    R. O. MURRY    3,173,122
HERMETICALLY SEALED RESISTOR

Filed June 18, 1962    2 Sheets-Sheet 1

ROBERT O. MURRY
INVENTOR

ATTORNEY

March 9, 1965 R. O. MURRY 3,173,122
HERMETICALLY SEALED RESISTOR
Filed June 18, 1962 2 Sheets-Sheet 2

ROBERT O. MURRY
INVENTOR

ATTORNEY

United States Patent Office 3,173,122
Patented Mar. 9, 1965

3,173,122
HERMETICALLY SEALED RESISTOR
Robert O. Murry, 1308 Summer St., Burlington, Iowa
Filed June 18, 1962, Ser. No. 203,146
5 Claims. (Cl. 338—237)

This invention pertains to hermetically sealed resistors and more particularly to a cap to be used therein.

In pressing a cap onto a resistive element or component to be used in a hermetic jacket the caps heretofore used have been of such design that the difference in sizes of the components due to manufacturing tolerances and small changes in basic design of the components have affected the outside diameter of the caps. There has therefore been a variation in the clearance between the outside diameter of the caps after the components have been pressed into them and the inside diameter of the hermetic jackets which has caused serious production problems during sealing the caps to the hermetic jackets. When the cap is to be joined to the hermetic jacket by welding it is necessary to exert substantial radial pressure on the cap during welding and assembly, thus making a heavy, sturdy cap bottom desirable to withstand this force. Also considerable heat is generated in the welding process, and it is desirable to provide means for dissipating this heat without transmitting it to the resistive element. It is desirable that the surfaces of the cap which join with the component and which join with the hermetically sealed jacket be of different materials. It is also desirable that the heavy bottom of the cap be of a still different material. Heretofore difficulty has been encountered in producing a cap with different surfaces, thicknesses, and materials to meet these needs.

It is therefore an object of this invention to provide a cap that can be pressed onto a resistive element or component with little or no effect on the outside diameter of the cap.

It is a further object of this invention to provide a cap for a resistive element or other component designed to be fitted into a hermetically sealed jacket whereby the economies of a thin-walled drawn cap may be combined with the advantages of a heavy base capable of withstanding considerable forces and capable of dissipating the heat created in assembly so as to not adversely affect the component.

It is a further object of this invention to provide an effective and economical way of combining the advantages of a sturdy base having optimum heat dissipating characteristics with those of a thin walled cap having an inside surface with optimum electrical contact properties and an outside surface with optimum weldability or solderability properties.

It is a further object of this invention to provide a cap that can be pressed onto a resistive element or other type component and which will permit the venting of the atmosphere trapped between the component and the inside of the cap during the capping operation.

It is a further object of this invention to provide a cap that can be pressed onto a resistive element or other type component and which will provide flexibility between the upper cap into which the component is pressed and the base of the cap to which the hermetic jacket is joined.

Further objects and advantages of the invention will become more apparent from the following drawings, descriptions and claims.

Figure 3:
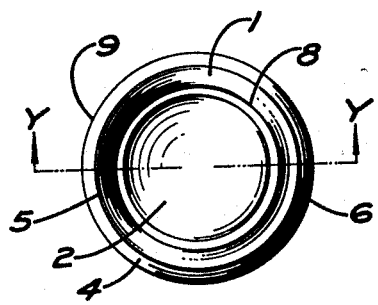
Figure 2:
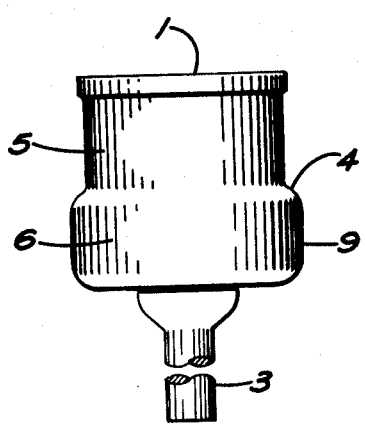
Figure 4:
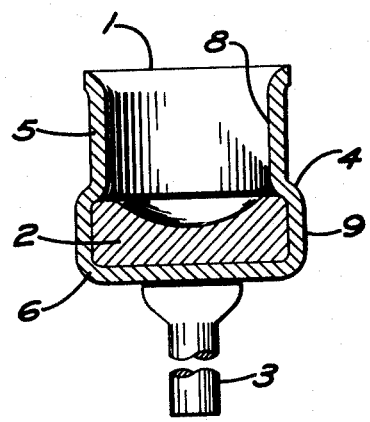
Figure 6:
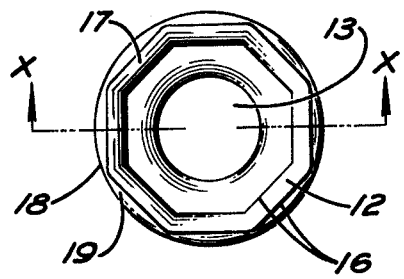
Figure 5:
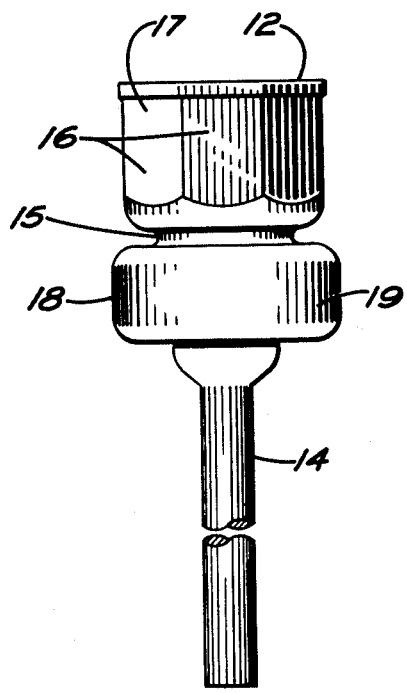
Figure 7:
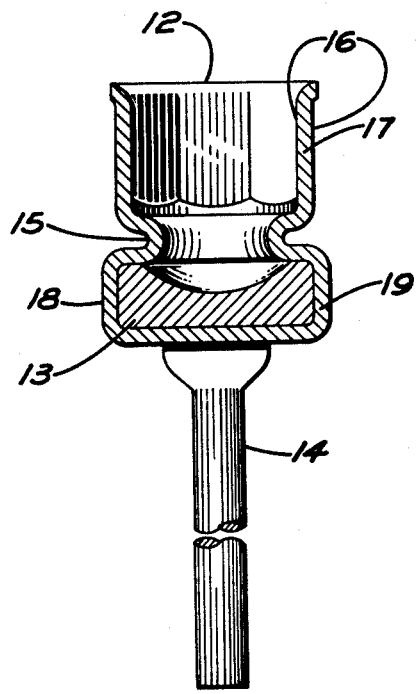

In the drawings FIG. 1 is a partial sectional view of the hermetically sealed resistor. FIG. 2 is an outside view of the cap. FIG. 3 is a top view of the cap. FIG. 4 is a sectional view of the cap taken on sectional line Y—Y. FIG. 5 is an outside view of a modification of the cap. FIG. 6 is a top view of the modification of the cap and FIG. 7 is a sectional view taken on section lines X—X of the modification of the cap.

The hermetically sealed resistor has a cap at each end. The caps are each composed of a cup 1 which has a metal disc 2 placed in its base portion 6. Lead wires 3 are fastened to the base portion 6 of the cup 1. There is a shoulder 4 in the cup 1 separating the upper portion 5 and the base portion 6 of the cup 1.

In the hermetically sealed resistor a resistive element or component 7 has a cap pressed on each end of it. The inner surface 8 of the upper portion 5 of the cup 1 makes an electrical contact with the resistive element 7. The outer surface 9 of the base portion 6 of the cup 1 is sealed to the hermetic jacket 10. The hermetic jacket 10 may be composed of plain glass, of glass or ceramic with a solderable metallized surface at the ends, of glass with tubular metal parts 11A sealed to the ends by glass-to-metal fusion seals, or of ceramic with tubular metal parts 11A sealed to the ends by ceramic-to-metal seals.

The outer surfaces 9 of the base portion 6 of the cup 1 and the inner surface 11 of the hermetic jacket 10 are sealed together by glass-to-metal seals in the case of the plain glass jacket, by soldering in the case of the metallized glass or ceramic jacket, or by welding in the case of the glass or ceramic jackets with metal end 11A.

The inner surface 8 of the upper portion 5 of the cup 1 is made of such diameter that a press fit exists between it and the component 7. In pressing the component 7 into the upper portion 5 of the cup 1 the base portion 6 of the cup 1 is not distorted by the press fit. Thus the diameter of the base portion 6 of the cup 1 will remain constant and the clearance between the surface 9 of the base portion 6 of the cup 1 and the inner surface 11 of the hermetic jacket 10 will not be affected by the variations in the size of the component 7 due to manufacturing tolerances or small changes in basic size or design of the component 7.

Some forms of resistive element are sensitive to heat, and in these cases the soldering or welding method of sealing is desirable because of the lesser heat required. In welding the surfaces 9 of the base portion 6 of the cup 1 to the tubular metal parts 11A sealed to the ends of the hermetic jacket 10, the disc 2 composed of material of optimum heat-sink properties provides a means for dissipating the heat through the base portion 6 of the cup 1, rather than transmitting it to the component 7 through the thin-walled upper portion 5 of the cup 1.

If it is desired to roll or crimp the tubular metal parts 11A sealed to the ends of the hermetic jacket 10 onto the base portion 6 of the cup 1, the disc 2 provides reinforcement to the cup 1 so that the cup 1 will not collapse under the pressure used for said joining. If a soldered seal is required between the surface 9 of the base portion 6 of the cup 1 and the inner surface 11 of the hermetic jacket 10, a crimping or rolling fit will hold the cup 1 in place in the hermetic jacket 10 both before and after the soldering process takes place.

An effective and economical method of obtaining a sturdy bottomed cap having relatively thin walls for press fit between a component 7 and the surface 8 of the upper portion 5 of the cup 1 is thus obtained. The surface 8 of the upper portion 5 of the cup 1 may be plated or clad for high electrical conductivity and the surface 9 of the base portion 6 of the cup 1 may be plated or clad for high weldability or solderability properties. The disc 2 may be of different material having optimum heat-sink properties.

Referring now to FIGS. 5, 6 and 7 a modification of the cap is shown. The cup 12 has a disc 13 inserted in its base portion 19. Lead wiers 14 are fastened to the base portion 19 of the cup 12. The neck 15 is formed into the cup 12 after the disc 13 is inserted therein. The inner and outer surfaces 16 of the upper portion 17 of the cup 12 are flat rather than being round. The outer surface 18 of the base portion 19 of the cup 12 is larger in diameter than the upper portion 17 of the cup 12 for purposes of joining with the inner surface of a hermetic jacket.

The cup 12 is inserted in a hermetic jacket such as the hermetic jacket 10 in the same fashion that the cup 1 is inserted in the hermetic jacket 10. The corners between the surfaces 16 in the upper portion 17 of the cup 12 allow the atmosphere that is trapped to escape when a component such as 7 is pressed into the upper portion 17 of the cup 12. Any tendency towards loosening of the grip of the upper portion of the cap 17 on the compoennt 7 due to the difference in the coefficient of expansion between materials of the component 7 and of the cap 12 will be compensated for by the elasticity of the surfaces 16.

The neck 15 allows a degree of flexibility for misalignment of either the component 7 or the hermetic jacket 10 in the assembly processes. Also the lengthwise difference in coefficient of thermal expansion between the hermetic jacket 10 and the component 7 can be compensated for by the flexibility of the neck 15.

Although lead wires 3 and 14 are shown attached to the cups 1 and 12 it is to be understood that electrical contacts may be made with the cups 1 and 12 by other means.

I claim:

1. A hermetically sealed resistor comprised of a component having two ends, a cap press fitted on each end of the component, a hermetic jacket disposed so as to receive the component with the caps thereon, each cap being a metal cup having a base portion and an upper portion, a metal disc secured in the base portion of each cup, a shoulder between the base portion and the upper portion of each cup, the base portion of each cup joined to the inside of the hermetic jacket.

2. A hermetically sealed resistor comprised of a component having two ends, a cap press fitted on each end of the component, a hermetic jacket disposed so as to receive the component with the caps thereon, each cap being a metal cup having a base portion and an upper portion, a metal disc having high heat dissipating properties secured in the base portion of each cup, a shoulder between the base portion and the upper portion of each cup, the base portion of each cup joined to the inside of the hermetic jacket.

3. A hermetically sealed resistor comprised of a component having two ends, a cap press fitted on each end of the component, a hermetic jacket disposed so as to receive the component with the caps thereon, each cap being a metal cup having a base portion and an upper portion, the entire upper portion of each cup having a smaller outside diameter than the outside diameter of the base portion of each cup, a metal disc having high heat dissipating properties secured in the base portion of each cup, the base portion of each cup joined to the inside of the hermetic jacket.

4. A hermetically sealed resistor comprised of a component having two ends, a cap press fitted on each end of the component, a hermetic jacket disposed so as to receive the component with the caps thereon, each cap being a metal cup having a base portion and an upper portion, the entire upper portion of each cup having a smaller outside diameter than the outside diameter of the base portion of each cup, a metal disc having high heat dissipating properties secured in the base portion of each cup, the metal disc having essentially complete contact with all surfaces of the base portion of the cup, the base portion of each cup joined to the inside of the hermetic jacket.

5. A hermetically sealed resistor comprised of a component having two ends, a cap press fitted on each end of the component, a hermetic jacket disposed so as to receive the component with the caps thereon, each cap being a metal cup having a base portion and an upper portion, the entire upper portion of each cup having a smaller outside diameter than the outside diameter of the base portion of each cup, a metal disc having high heat dissipating properties secured in the base portion of each cup, the metal disc having essentially complete contact with all surfaces of the base portion of each cup, the upper portion and the base portion of each being flexible in relation to each other by means of a neck separating them, the base portion of each cup joined to the inside of the hermetic jacket.

References Cited by the Examiner

UNITED STATES PATENTS

| | | | |
|---|---|---|---|
| 905,503 | 12/08 | Cook | 338—332 |
| 1,506,049 | 8/24 | Condit | 200—132 |
| 1,601,673 | 9/26 | Bridgman | 200—128 X |
| 1,715,879 | 6/28 | Wells | 338—332 X |
| 1,841,930 | 1/32 | Baum | 338—332 X |
| 1,842,191 | 1/32 | Oppenheim | 338—332 X |
| 2,046,922 | 7/36 | Minnium | 338—273 |
| 2,215,587 | 9/40 | Kerschbaum | 338—274 X |
| 2,533,876 | 12/50 | Cerny | 338—322 X |
| 2,635,162 | 4/53 | Kohring | 338—322 X |
| 2,655,577 | 10/53 | Von Hoorn | 200—132 |
| 2,815,474 | 12/57 | Lewis et al. | 174—152.4 |
| 2,933,589 | 4/60 | Pierce | 338—332 |
| 2,964,688 | 12/60 | McAdam. | |
| 3,037,266 | 6/62 | Pfister | 338—226 X |

FOREIGN PATENTS

| | | |
|---|---|---|
| 531,947 | 1/41 | Great Britain. |
| 547,905 | 9/56 | Italy. |
| 1,279,369 | 11/61 | France. |

RICHARD M. WOOD, *Primary Examiner.*

UNITED STATES PATENT OFFICE
CERTIFICATE OF CORRECTION

Patent No. 3,173,122                                March 9, 1965

Robert O. Murry

It is hereby certified that error appears in the above numbered patent requiring correction and that the said Letters Patent should read as corrected below.

Column 2, line 25, for "end" read -- ends --; line 69, for "wiers" read -- wires --; column 3, line 13, for "compoennt" read -- component --; column 4, line 27, after "each" insert -- cup --.

Signed and sealed this 21st day of December 1965.

(SEAL)
Attest:

ERNEST W. SWIDER                              EDWARD J. BRENNER
Attesting Officer                                  Commissioner of Patents